United States Patent [19]
Foresman

[11] Patent Number: 5,487,862
[45] Date of Patent: Jan. 30, 1996

[54] ANNULAR GAP EXPANDER PELLET FORMER AND PROCESS OF USING SAME

[75] Inventor: James D. Foresman, Hughesville, Pa.

[73] Assignee: Andritz Sprout-Bauer, Inc., Muncy, Pa.

[21] Appl. No.: 245,599

[22] Filed: May 18, 1994

[51] Int. Cl.⁶ ............................................ B29C 47/08
[52] U.S. Cl. ............ 264/142; 264/211.11; 264/211.21; 425/203; 425/311; 425/313; 425/331; 425/382.3; 425/382.4; 426/516
[58] Field of Search ............................ 425/331, 308, 425/310, 311, 313, 202, 203, 382.3, 382.4; 264/141, 140, 211.1, 211.11, 118, 211.21, 142; 426/516

[56] References Cited

U.S. PATENT DOCUMENTS

| | | | |
|---|---|---|---|
| 2,798,444 | 7/1957 | Meakin | 425/331 |
| 3,010,150 | 11/1961 | Meakin | 425/331 |
| 3,304,578 | 2/1967 | Clute | 425/382 R |
| 3,332,111 | 7/1967 | Häfliger | 425/331 |
| 3,807,926 | 4/1974 | Morse | 425/331 |
| 3,908,025 | 9/1975 | Miller et al. | 426/623 |
| 3,981,664 | 9/1976 | Bittner et al. | 425/331 |
| 4,097,213 | 6/1978 | McComb et al. | 425/466 |
| 4,977,908 | 12/1990 | Luke | 131/175 |
| 5,271,728 | 12/1993 | Froidevaux et al. | 426/516 |
| 5,366,680 | 11/1994 | Foresman | 264/141 |
| 5,399,080 | 3/1995 | Van Benthum | 425/331 |

FOREIGN PATENT DOCUMENTS

| | | | |
|---|---|---|---|
| WO93/04594 | 3/1993 | WIPO | 366/81 |
| WO93/06742 | 4/1993 | WIPO | 425/313 |
| WO94/26507 | 11/1994 | WIPO . | |

Primary Examiner—Robert B. Davis
Attorney, Agent, or Firm—Chilton, Alix & Van Kirk

[57] ABSTRACT

A method and apparatus in the context of a pellet former (10) that is integral to an annular gap extruder/expander (11). A housing (30) is disposed around the annular gap extruder outlet end. Material is received from annular gap (37) on the face of a rotating disc (14) and, upon expansion, is directed into a roller area (43) by feed plows (23) or a screw flight (42). Pellet rollers (24) rotatably mounted on the disc push the material through a ring pellet die (22) disposed around the roller area. Cut off knives (25) attached to the disc cut the material into pellets as it exits the pellet die.

29 Claims, 4 Drawing Sheets

ANNULAR GAP EXPANDER PELLET FORMER AND PROCESS OF USING SAME

BACKGROUND OF THE INVENTION

The present invention relates to a pellet former for use with an annular gap extruder or expander.

A recent development in the feed industry has been the use of extruder type high compression screws to highly condition animal feeds prior to pelleting. Feed material is subjected to a high degree of mechanical shear and heat in the extruder, softening the feed material. The material is then expanded and formed through pelletizing discs.

Current practice generally requires the transport of this softened, expanded feed material to a separate pelleting system. Typically, conveyors and surge bins are utilized in the feed transport system. Such extruder, feed transport and pelleting systems require large amounts of floor space. Additionally, the feed material cools and becomes less soft before it is processed by the pelleting system. As a result, higher mechanical forces are required to make the pellets.

U.S. Pat. No. 5,242,292, discloses an extruder with a pelleting head adjacent the outlet end of the extruder barrel. A rotatable, multiple-vane plate pushes unexpanded material deposited in the pelleting head through a pellet die. The plate may be coupled to the primary extruder screw or secured to a separate primary mover. The device of U.S. Pat. No. 5,242,292 utilizes a cooling water jacket to control the temperature of the material as it passes through the extruder. Such temperature maintenance is designed to prevent expansion of the material as it emerges from the pelleting head. Expansion of the material as it exits the die results in less dense pellets. The pellets produced by this apparatus must be dried from a moisture level of 18–30% to 8–14% by weight.

SUMMARY OF THE INVENTION

The present invention overcomes the above briefly discussed and other deficiencies and disadvantages of the prior art by combining a conditioner expander, and pellet die system into one machine.

As disclosed in pending U.S. Pat. No. 5,366,680, a distinguishing feature of that annular gap expander is that the discharge flow restriction from the conditioner portion of the device is controlled by adjusting an annular gap between the face of a rotating disc attached to the discharge end of the screw and an axially adjustable cylindrical housing which surrounds the discharge end of the screw. The present invention is based on the insight that this arrangement not only allows accessibility to the discharge end of the screw shaft, but enables components such as a pelletizer, to be added to and driven by the end of the screw shaft.

A pellet former in accordance with a preferred embodiment of this invention comprises a second, pellet die housing disposed around the discharge annulus of the conditioner. The pellet die housing has an inlet port disposed around the axially adjustable, cylindrical housing, leading to a pellet die within and attached to the second housing. Pellet rollers, pellet knives and feed plows are attached to the rotating disc within the pellet die housing.

Conditioned material expands through the inlet port onto the feed plow area of the disc. The feed plows direct the material into the space between the disc and pellet die. The pellet rollers push the feed material through the pellet die. The feed material is cut into pellets by the pellet knives after it passes through the pellet die.

The invention provides several significant advantages. A high degree of mechanical shear and heat is added to the feed material in the conditioner portion of the annular gap expander, highly softening the feed material. Because this soft material is put through a pellet former immediately after expansion, the power requirement of the pellet former is greatly reduced and the mechanical forces generated in the pellet former are lower. As a result thinner dies can be used and mechanical components of the former do not have to be as rugged as in conventional pelleting operations where expanders are not used. Expanding the material and flashing off steam before the pelleting die results in drier product and denser pellets. Therefore, the pellets produced by the present invention require less time to dry to the target commercial moisture level. A practical benefit of the invention in fabricating feed pellets is that the nutritional benefits of starch gelatinization due to expansion are combined with dense, hard pellets.

Additionally, by combining the expander and pellet former into one machine, the number of required drives and the necessary floor space are reduced since there is no need for surge bins and conveyors normally needed in conventional expander/pelleting systems.

BRIEF DESCRIPTION OF THE DRAWINGS

The present invention may be better understood and its objects and advantages will become apparent to those skilled in the art by reference to the accompanying drawings wherein like reference numerals refer to like elements in the several figures and in which.

DESCRIPTION OF THE PREFERRED EMBODIMENT

Figure 1:
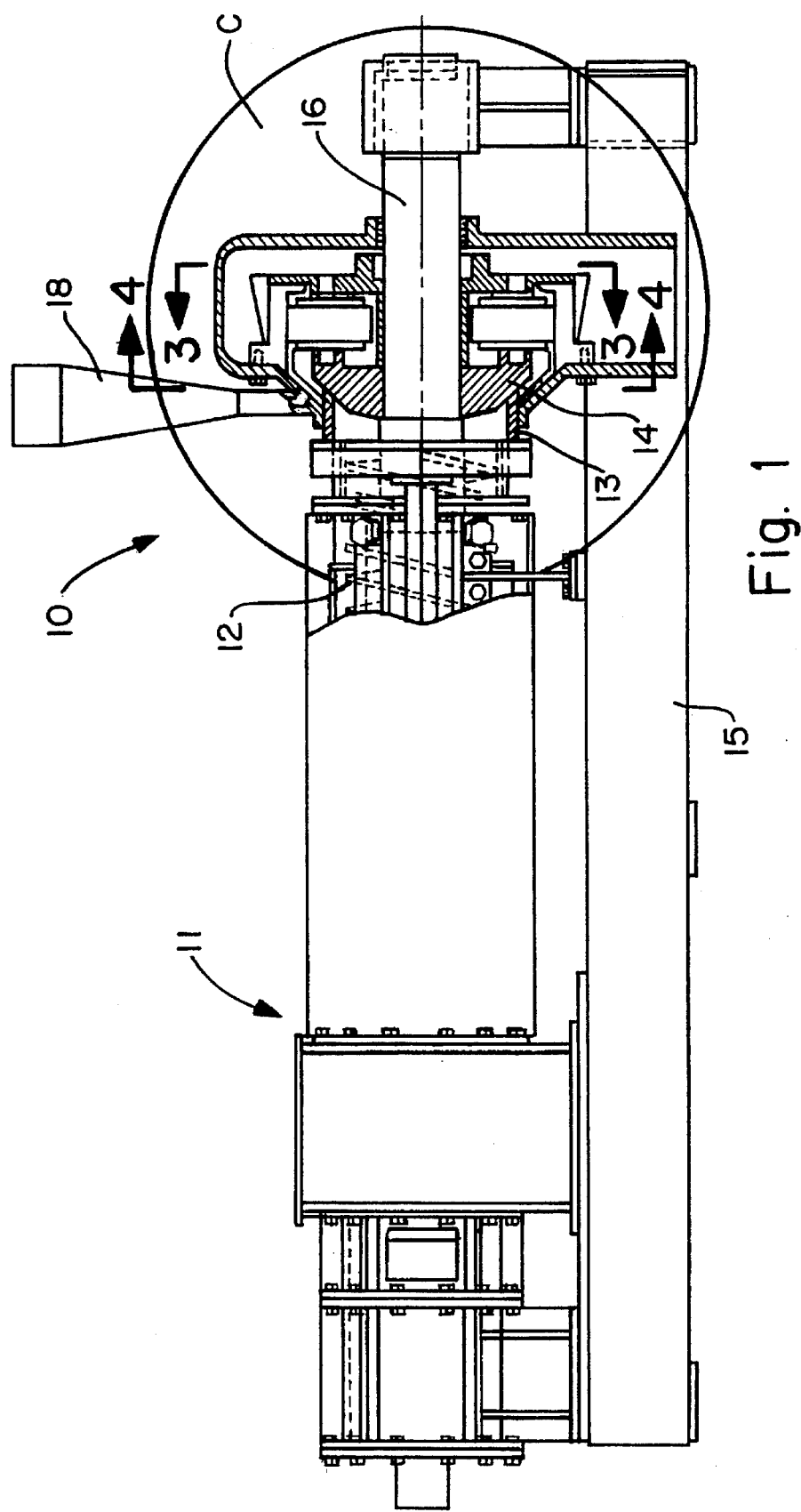
FIG. 1 is a sectional view of the preferred embodiment of an annular gap expander pellet former in accordance with the invention.
Figure 2:
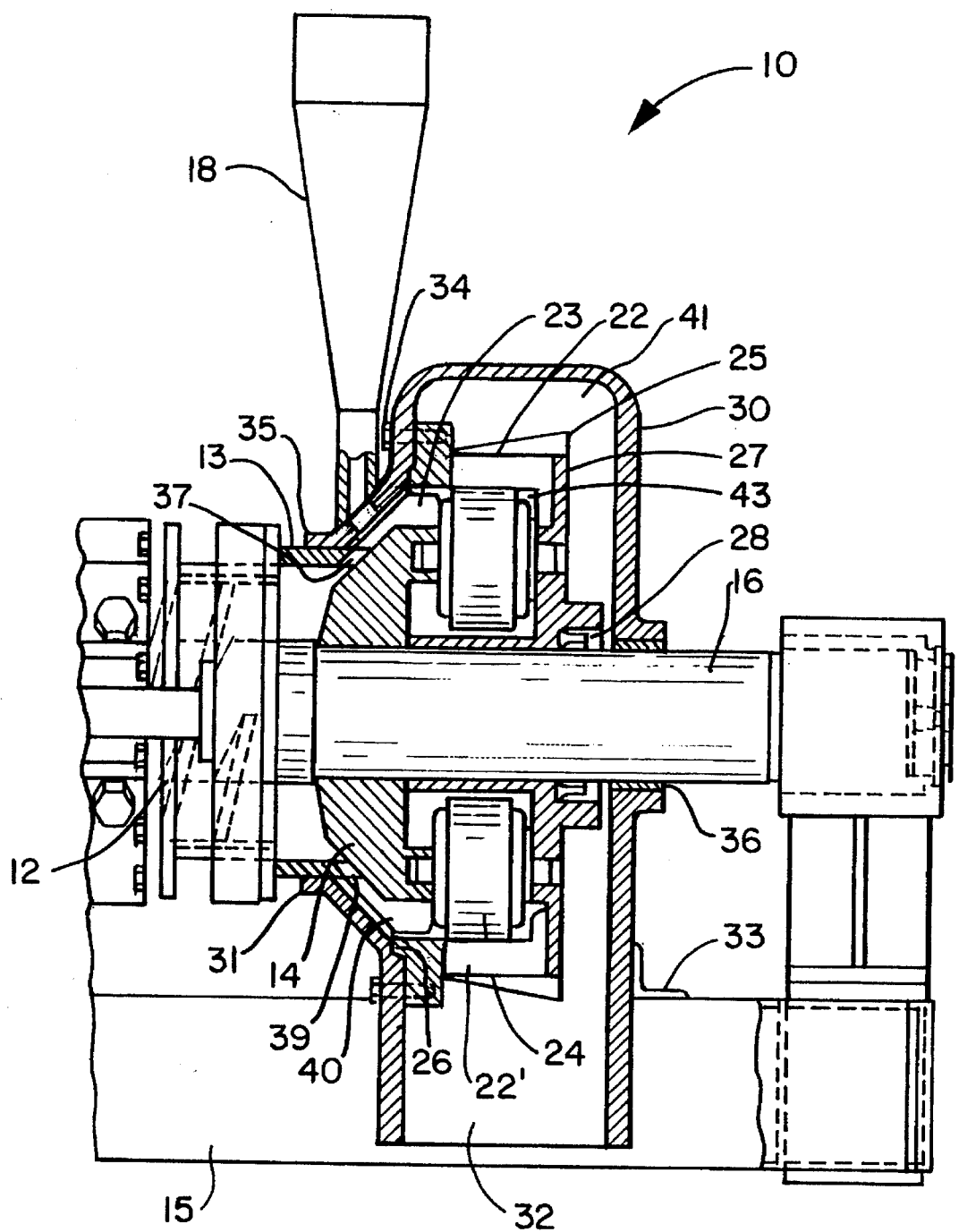
FIG. 2 is an exploded view of the annular gap expander pellet former, taken within area C of FIG. 1.
Figure 3:
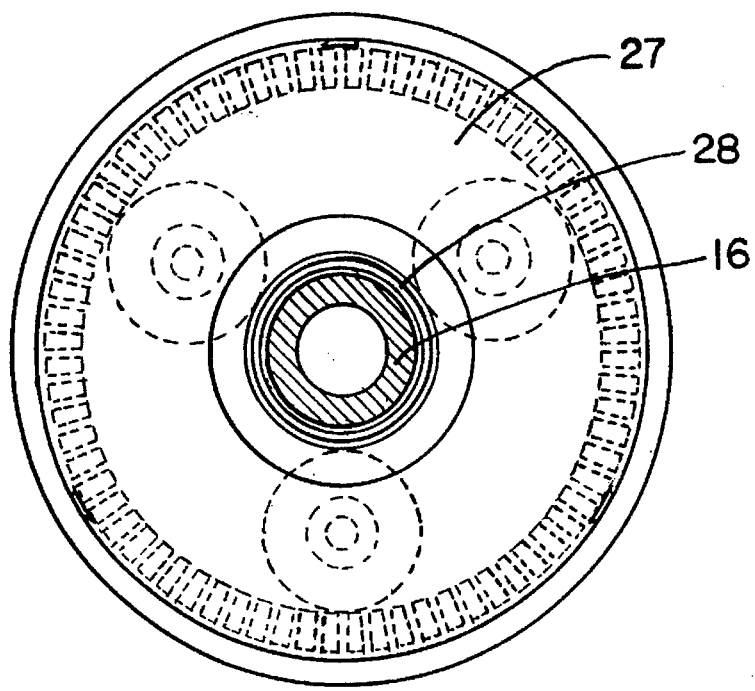
FIG. 3 is a cross-section view of the annular gap expander pellet former, taken along line 3—3 of FIG. 1.
Figure 4:
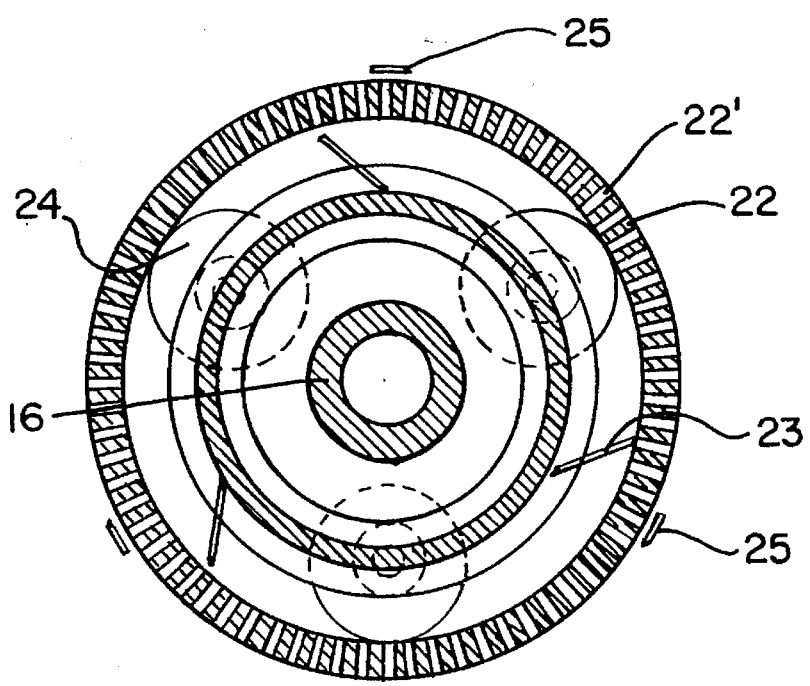
FIG. 4 is a cross-section view of the annular gap expander pellet former, taken along line 4—4 of FIG. 1 with the housing removed.

FIG. 1 shows an annular gap expander and pellet former unit 10 which includes an annular gap expander 11 having a compression screw 12, a compression screw shaft 16, an axially adjustable cylindrical housing 13 and a rotating disc 14 mounted on the compression screw shaft 16. The disc 14 may have any body shape permitted within the scope of pending U.S. patent application Ser. No. 08/059,236, filed May 7, 1993, the disclosure of which is hereby incorporated by reference. The annular gap expander is mounted to a base 15. FIGS. 2–4 show an exploded and two section views of the downstream end of pellet former 10. The pellet former 10 includes a second, pellet die housing 30, a pellet die 22, a support plate 27 and pellet cut off knives 25.

The pellet die housing 30 has an inlet 31 disposed coaxially around and slidably receiving the expander discharge housing 13, a compression screw shaft port or bearing 36 disposed coaxially around to receive or support the compression screw shaft 16 and a pellet outlet 32. The pellet die housing 30 is mounted to the base 15 by a housing support 33.

The pellet die 22 is mounted on the inside front face of the pellet die housing 30. A tapered fit 26 between the pellet die 22 and the pellet die housing 30 produces interference as the mounting bolts 34 are tightened. The pellet die 22 is coaxial to the rotating disc 14, defining an annular expansion chamber 40 and an annular inlet chamber 43 between the pellet die 22 and the rotating disc 14 and an annular outlet chamber 41 between the pellet die 22 and the pellet die housing 30 leading to pellet outlet 32. The pellet die has a plurality of radially extending die bores 22' for forming feed pellets.

A support plate 27 is mounted on the back of the rotating disc 14. Alternatively, the support plate 27 may be mounted to the compression screw shaft 16 behind the rotating disc 14. A plurality of pellet cut off knives 25 are mounted in spaced apart relation on the periphery of the support plate 27. The pellet cut off knives extend over the outside surface of the pellet die 22 into the annular area 41. A hub locking device 28 secures the rotating disc 14 and the support plate 27 to the compression screw shaft 16.

Feed material is subjected to a high degree of mechanical shear, heat and compression in the upstream portion of the annular gap expander 11. The compression screw 12 forces a stream of such highly conditioned feed material into the annular extrusion gap 37 between the axially adjustable housing 13 and the rotating disc 14. The feed material then expands abruptly due to steam flash-off as it enters the pellet die housing 30 at the widening annular expansion volume of the inlet port 39 which surrounds the discharge opening. The steam is vented to atmosphere from the expansion inlet port 39, via a steam vent 18. This maintains the volume in the annular expansion chamber 40, at substantialy atmospheric pressure. Continued introduction of feed material into the pellet die housing 30 forces the feed material into the inlet chamber 43 and then through the pellet die bores 22'. The rotating disc 14, support plate 27 and pellet cut off knives 25, which are mounted on the compression screw shaft 16, rotate with the compression screw 12. As the feed material emerges from the pellet die 22 into area 41, it is cut into pellets by the pellet cut off knives 25. The pellets exit the pellet die housing 30 by way of the pellet outlet 32.

Expanding the material prior to forming pellets is preferable to pelleting unexpanded material. Expanding the material and the resultant flash-off of moisture from the material prior to pelleting produces a drier product and denser pellets. It is desirable to keep the pellet moisture and temperature levels sufficiently low that conventional air evaporative pellet coolers can be used to cool and dry the pellets for storage and handling purposes. When high temperature extruded material is forced through a die without any expansion and steam flash-off taking place before the die, the product expands as it exits the die resulting in less dense pellets. The present invention provides the nutritional benefits of starch gelatinization due to expansion of the material and dense pellets with high hardness.

In a preferred embodiment, a plurality of pellet rollers 24 are rotatably mounted between and supported by the rotating disc 14 and the support plate 27. The pellet rollers 24 are mounted in spread apart relation for operation within the inlet chamber 43. The outer circumference of the pellet rollers 24 rides against the inside surface of the pellet die 22. The pellet rollers 24 force the feed material through the pellet die bores 22'.

In another preferred embodiment, a plurality of feed plows 23 are mounted in spread apart relationship on the rotating disc 14 upstream of the pellet rollers in the expansion chamber 40. Generally, the feed plows 23 extend over the face and the side of the disc 14, as shown in FIG. 2. However, the feed plows 23 may be limited to only the disc face or the disc side in certain applications. The feed plows 23 receive the feed material as it expands on being extruded from the annular gap 37 and direct it into the inlet chamber 43 for contact by the pellet rollers 24.

Figure 5:
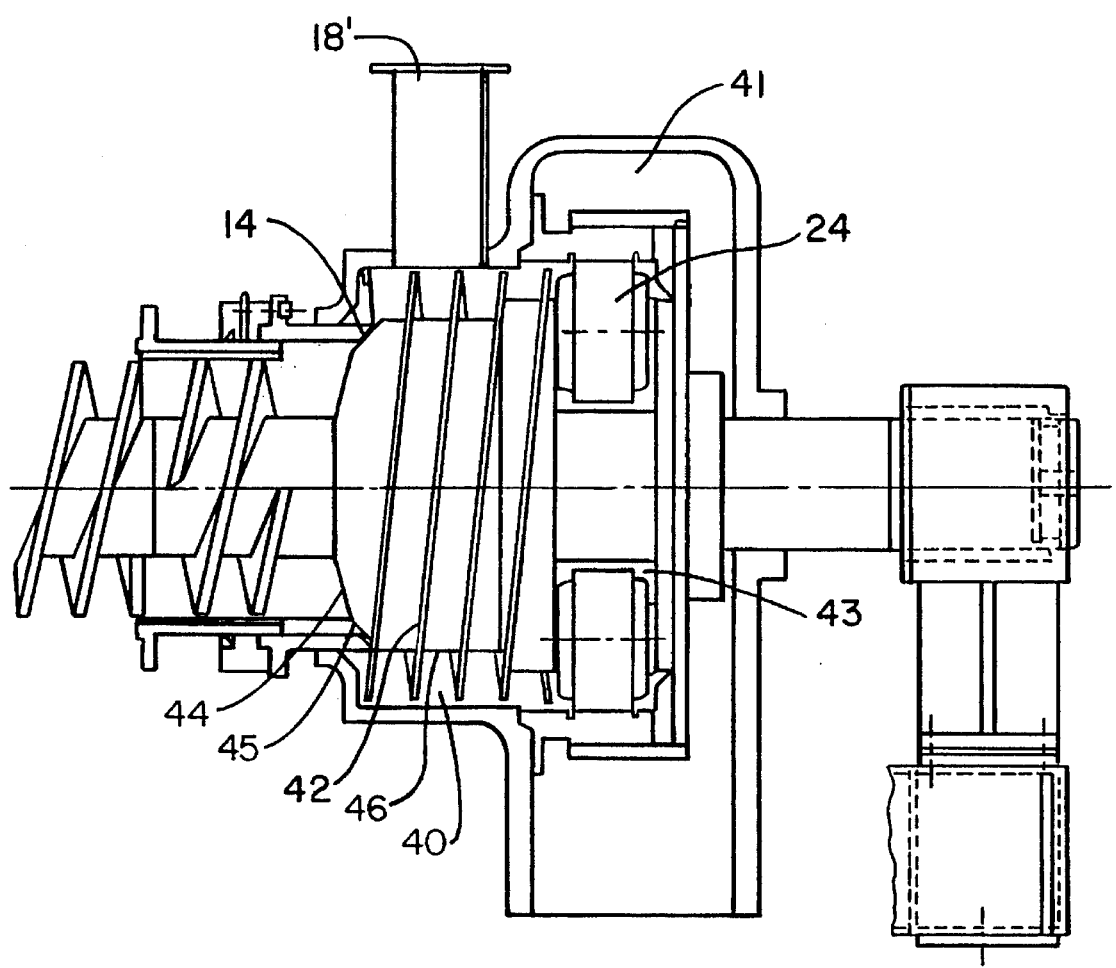
FIG. 5 is a cross-section view of an alternate embodiment of the annular gap expander pellet former of FIG. 2.

In an alternate embodiment, a screw or ribbon flight 42 is mounted on the rotating disc 14 upstream of the pellet rollers 24 in the expansion chamber 40, as shown in FIG. 5. The disc 14 has a body shape similar to that shown in FIG. 7 of U.S. Pat. No. 5,366,680, wherein the disc face defines a frustroconical plate with a first surface 44 that extends from the outer surface of the shaft 16 to an intermediate radius and a second surface 45 that extends from the intermediate radius to the disc side 46. Generally, the flight 42 is mounted on the disc side 46. Alternatively, a portion of the flight may be mounted on the second disc surface 45. The flights 42 receive the feed material as it expands on being extruded from the annular gap 37 and convey it into the inlet chamber 43 for contact by the pellet rollers 24. The flights 42 may be either solid screw flights or ribbons. Ribbons would be used if steam back-flowing from the inlet chamber 43 was expected to interfere with conveying the material. Use of the flights 42 allows the distance between the annular gap 37 and the inlet chamber 43 to be increased. This increases the size of the expansion chamber 40, allowing more complete expansion of the feed and a greater release of moisture entrained in the feed. The steam vent 18' is larger than that used in other embodiments to provide proper venting of the larger expansion chamber 40. A larger steam vent 18 assures that the inlet chamber 43 is kept at a zero pressure differential across the pellet die 22 and that excess moisture is removed prior to pelleting in certain applications.

In yet another preferred embodiment, the joint between the axially adjustable housing 13 and the pellet die housing inlet 31 is sealed by a conventional sealing arrangement 35, for example, a packing gland, lip seals or O-rings.

I claim:

1. An annular gap expander with a pellet former, comprising:

a conditioning expander including a compression screw for conditioning feed material and a discharge end in which are situated a compression screw shaft, a first axially adjustable housing coaxially disposed around said compression screw and defining a discharge opening, a rotating member transversely mounted to said screw shaft near said first housing discharge opening thereby defining an annular extrusion gap between the rotating member and the discharge opening;

a second housing having an inlet port coaxially disposed around the discharge opening of said first axially adjustable housing for receiving expanded material from said annular extrusion gap, means for coaxially receiving said screw shaft, and a pellet outlet port;

a pellet die housed within and attached to said second housing, said pellet die being coaxial with said rotating member, and having an interior surface, an exterior surface, and a plurality of die bores extending radially between said surfaces;

a support plate situated in said second housing and rotatable by said screw shaft; and a plurality of cut-off knives mounted in spaced apart relation on said support plate, said cut-off knives extending over said pellet die exterior surface to cut pellets as material emerges from said die exterior surface.

2. The annular gap expander pellet former of claim 1, wherein said support plate is mounted transversely on said screw shaft.

3. The annular gap expander pellet former of claim 1, wherein said support plate is mounted to said rotating member.

4. The annular gap expander pellet former of claim 1, further comprising a plurality of pellet rollers rotatably mounted between said rotating member and said support plate.

5. The annular gap expander pellet former of claim 4, further comprising a plurality of feed plows mounted in spread apart relation on said rotating member upstream of said pellet rollers.

6. The annular gap expander pellet former of claim 1, further comprising means for slidably sealing said first axially adjustable housing and the second housing inlet port.

7. The annular gap expander pellet former of claim 6, wherein said sealing means is selected from the group consisting of packing glands, lip seals and O-rings.

8. The annular gap expander pellet former of claim 1, wherein the inlet port is juxtaposed with the rotating member to define an annular expansion chamber for receiving and abruptly expanding the material from the extrusion gap before the material reaches the pellet die.

9. The annular gap expander pellet former of claim 8, further comprising a plurality of feed plows mounted in spread apart relation on said rotating member in said expansion chamber for directing expanded material toward the pellet die.

10. The annular gap expander pellet former of claim 8, further comprising means for maintaining said expansion chamber substantially at atmospheric pressure.

11. The annular gap expander pellet former of claim 10, wherein said means for maintaining said expansion chamber pressure comprises a steam vent, said steam vent being in fluid communication with said expansion chamber.

12. The annular gap expander pellet former of claim 8, further comprising a screw flight mounted on said rotating member in said expansion chamber for conveying expanded material toward the pellet die.

13. The annular gap expander pellet former of claim 12, wherein said rotating member has a face portion and a side portion, said face portion and said discharge opening defining said annular extrusion gap.

14. The annular gap expander pellet former of claim 13, wherein said screw flight is mounted on said rotating member side portion.

15. The annular gap expander pellet former of claim 14, further comprising means for maintaining said expansion chamber substantially at atmospheric pressure.

16. The annular gap expander pellet former of claim 15, wherein said means for maintaining said expansion chamber pressure comprises a steam vent, said steam vent being in fluid communication with said expansion chamber.

17. The annular gap expander pellet former of claim 16, wherein said expansion chamber has a longitudinal length, said steam vent being substantially in fluid communication with said expansion chamber along said length.

18. A material pellet former for an annular gap expander, the expander having a discharge end including a compression screw on a screw shaft, an axially adjustable first housing disposed around said compression screw and defining a discharge opening, and a rotating disc transversely mounted to the screw shaft at the first housing discharge opening, thereby defining a first annular gap, said pellet former comprising:

a second housing disposed at the annular gap expander discharge end, said second housing having an inlet port at one end coaxially disposed around the first housing, a shaft port at the opposite axial end coaxially disposed around the screw shaft, and a pellet discharge port, the second housing inlet port defining an annular expansion chamber with said disc for receiving expanded material from said annular gap;

die means housed within and supported by said second housing, said die means being coaxially disposed in fixed relation around the rotating disc for receiving expanded material from said expansion chamber; and means rotatable by the shaft within the second housing, for urging expanded material from the expansion chamber, through said die means.

19. The annular gap expander pellet former of claim 18, including means for cutting material into pellets after passage through the die means.

20. The annular gap expander pellet former of claim 18, wherein the means for urging includes a plurality of rollers supported by said disc.

21. The annular gap expander pellet former of claim 18, further comprising means for maintaining said expansion chamber substantially at atmospheric pressure whereby material entering the expansion chamber decompresses and expands while releasing steam.

22. The annular gap expander pellet former of claim 21, wherein said means for maintaining said expansion chamber pressure comprises a steam vent, said steam vent being in fluid communication with said expansion chamber.

23. The annular gap expander pellet former of claim 22, further comprising a plurality of feed plows supported by said disc in said expansion chamber for directing expanded material to said rollers.

24. The annular gap expander pellet former of claim 22, further comprising a screw flight mounted on said disc in said expansion chamber for directing expanded material to said rollers.

25. The annular gap expander pellet former of claim 24, wherein said disc has a side portion, said screw flight being mounted on said disc side portion.

26. The annular gap expander pellet former of claim 25, wherein said expansion chamber has a longitudinal length, said steam vent being substantially in fluid communication with said expansion chamber along said length.

27. A method for pelletizing moisture bearing material expanded from a compression screw extruder, the extruder having a screw shaft and a rotating member transversely mounted on the screw shaft, the method comprising the steps of:

receiving and expanding the extruded material by steam flashing on a face of the rotating member;

venting the steam produced during expansion of the material;

directing the expanded material from the face of the member to a roller area around the member;

rolling the material through a pellet die disposed around the member; and cutting the material into pellets after the material passes through the pellet die.

28. A method for pelletizing moisture-laden material from a screw type annular gap expander, the expander having a screw shaft and a rotating disc transversely mounted on the screw shaft, the method comprising the steps of:

expanding the material at the face of the rotating disc to release steam;

venting the steam produced during expansion of the material;

directing the material from the face of the disc, with feed plows mounted on the disc, to pellet rollers rotatable with the disc; and rolling the material through a ring pellet die disposed in fixed position around the disc and screw shaft.

29. A method for pelletizing moisture-laden material from a screw type annular gap expander, the expander having a screw shaft and a rotating disc transversely mounted on the screw shaft, the method comprising the steps of:

expanding the material at the face of the rotating disc to release steam;

venting the steam produced during expansion of the material;

directing the material from the face of the disc, with a screw flight mounted on the disc, to pellet rollers rotatable with the disc; and rolling the material through a ring pellet die disposed in fixed position around the disc and screw shaft.

* * * * *